United States Patent [19]

Aydemir et al.

[11] Patent Number: 6,122,254
[45] Date of Patent: Sep. 19, 2000

[54] METHOD AND APPARATUS FOR NETWORK FLOW CONTROL WITH PERCEPTIVE PARAMETERS

[75] Inventors: Metin Aydemir, Durham, N.C.; Clark Debs Jeffries, Clemson, S.C.

[73] Assignee: International Business Machines Corporation, Armonk, N.Y.

[21] Appl. No.: 08/978,108

[22] Filed: Nov. 25, 1997

[51] Int. Cl.[7] .......................... G01R 31/08; G06F 11/00; G08C 15/00
[52] U.S. Cl. ........................................... 370/235; 709/234
[58] Field of Search .................................. 370/229, 230, 370/231, 232, 236, 237, 252, 254, 255, 235; 709/238

[56] References Cited

U.S. PATENT DOCUMENTS

| | | |
|---|---|---|
| 5,142,570 | 8/1992 | Chaudhary et al. ................... 379/221 |
| 5,313,454 | 5/1994 | Bustini et al. ............................ 370/13 |
| 5,359,593 | 10/1994 | Derby et al. .............................. 370/17 |
| 5,434,848 | 7/1995 | Chimento, Jr. et al. .................. 370/17 |
| 5,675,576 | 10/1997 | Kakampoukas et al. ............... 370/232 |
| 5,812,527 | 9/1998 | Kline et al. ............................. 370/232 |
| 5,852,601 | 12/1998 | Newman et al. ....................... 370/230 |
| 5,936,940 | 8/1999 | Marin et al. ............................ 370/232 |
| 5,940,372 | 8/1999 | Bertin et al. ............................ 370/238 |

*Primary Examiner*—Alpus H. Hsu
*Assistant Examiner*—Duc Ho
*Attorney, Agent, or Firm*—Gerald R. Woods

[57] ABSTRACT

A method and apparatus for flow control for sources in packet switched networks is implemented. A data rate for the source is determined based on a critically damped second-order system in response to a congestion signal sent by a destination node or other network device. The data rate is damped toward a share value that is also based on a critically damped second-order system. The resulting flow control reduces packet loss and improves network utilization.

29 Claims, 3 Drawing Sheets

20 flow. However, accounting for flow inertia, which can have
METHOD AND APPARATUS FOR NETWORK FLOW CONTROL WITH PERCEPTIVE PARAMETERS

CROSS-REFERENCE TO RELATED APPLICATIONS

The present invention is related to U.S. patent application Ser. No. 08/977,475 filed Nov. 24, 1997 and U.S. patent application Ser. No. 08/978,178 filed Nov. 25, 1997, which are hereby incorporated by reference herein.

TECHNICAL FIELD

The present invention relates in general to data processing networks, and in particular, to a method and apparatus for data packet flow control in packet switched networks.

BACKGROUND INFORMATION

In high-speed packet communications networks, several classes of traffic share the common resources of the network. For example, interactive video presents both delay and loss sensitive traffic while voice presents delay sensitive but loss tolerant traffic. File transfers present loss sensitive but delay tolerant traffic, while datagram service provide traffic which is both delay tolerant and loss tolerant traffic. The first two types of traffic (interactive video and voice) are generally referred to as reserved services since an end-to-end connection must be in place before the user traffic can be launched on the network. The last two types of traffic (file transfer and datagrams), on the other hand, are non-reserved services since they can be launched on the network with no fixed route reserved, but which find their way through the network one link at a time based on local availability. Non-reserved serves, often called "best efforts" services, are bursty, delay tolerant and require no explicit quality of service guarantee.

Best effort services are extremely useful in maximizing the utilization of the network resources, much beyond the utilization level possible with reserved traffic alone. However, when both reserved and non-reserved traffic are integrated on a single network, it is necessary to ensure that he best effort traffic does not cause degradation of the reserved services traffic. One solution to this problem is provided by a separate link buffer by the two classes of traffic, and transmitting best effort traffic only when there is no reserve traffic waiting to be transmitted. from the local node onto that link. This arrangement makes the effect of the best effort traffic on the reserve traffic negligible. Typically, a reserved traffic packet would at most wait for the transmission of a single best effort packet. If a link is very slow, a preemptive priority can be assigned to the reserved traffic to eliminate even such a minimum single best effort packet delay. If no control is applied to the best effort service, the amount of traffic served approaches the maximum available network capacity, but at the price of creating congestion at the buffers of the network. If congestion causes the loss of transmitted traffic, then it is necessary to retransmit the lost packet, reducing the network utilization.

It is therefore clear that congestion control and congestion avoidance are essential to orderly network management, particularly as the demands generated from best effort traffic approach or exceed the available capacity of the network. One method of congestion control relies on the periodic transmission of time-stamped sampling packets through the network on a selected route and then processing of the selectivity received samples to determine the state of congestion on that route. The difference in the transit time intervals between successive sampling packets provides an indication of the network congestion. When this delay information exceeds a threshold value, the destination returns a value in a sampling packet that indicates to the sending stations that a state of congestion exists on the network. Otherwise, the return sampling packet indicates a state of no congestion. Thus, the information the source station receives in order to adapt to network conditions is coarse grained. The sending station is either told that the network is congested, or that the network has no congestion. Based on this coarse grained signal, the sending station makes decisions with respect to the modification of its data rate.

The source station modifies its data rate through a collection of increase or decrease fractions. The values of fractional increase or decrease thresholds are set by system administrators and generally do not carry over from one network to another. Furthermore, the congestion management decisions are based on the present flow to estimate next flow. However, accounting for flow inertia, which can have the effect of smoothing the coarse grained congestion indications, can improve performance of adaptive flow control methods. Thus, there is a need in the art for a method and apparatus that uses both present and previous flows to compute next flows, in order to reduce losses and increases throughput.

SUMMARY OF THE INVENTION

The present invention addresses the previously mentioned needs by providing a method and apparatus of flow control based on the concept of a second-order critically damped system. Such a second-order system estimates future flows using both present and past flows, and thereby provides an improved estimate of flow conditions in congested networks. The critical damping toward a desired rate is an optimal damping.

The method of the present invention estimates a share of network capacity that a data source should have if network throughput is to be optimal. Then, the data rate for each source is driven toward the calculated share using the critically damped second-order system. These calculations use a congestion indication provided by the destination node or other network device. The congestion indication may be derived by any method whatsoever, provided that they are a preselected pair of numerical values.

The share itself is determined using an algorithm based on a second critically damped second-order system. During periods when the network is congestion free, this system drives the share toward a desired value which may be the maximum link rate in the network. In the presence of network congestion, the share is driven toward zero. It may also be driven toward a negative share until it reaches zero, and then maintained at zero share until the network congestion subsides, as the share is always positive or zero.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
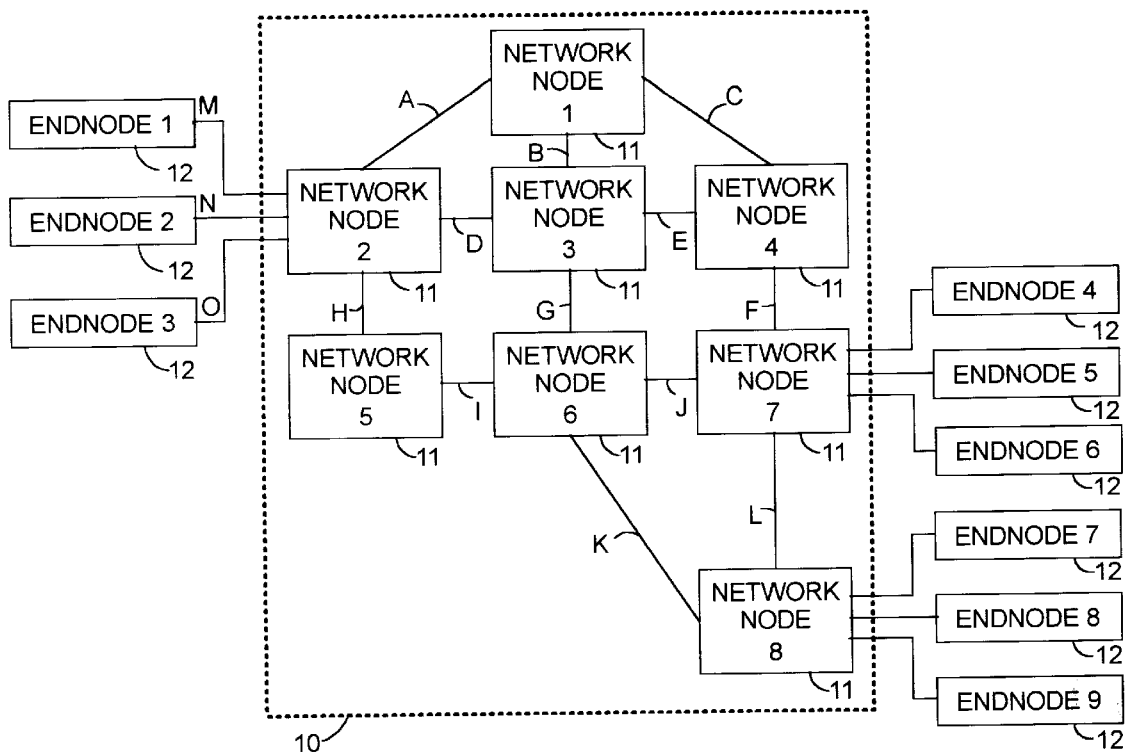
FIG. 1 shows a general block diagram of a packet communications network in which adaptive congestion control according to the present invention might be used.

In the following description, numerous specific details are set forth such as specific word or byte lengths, etc. to provide a thorough understanding of the present invention. However, it will be obvious to those skilled in the art that the present invention may be practices without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network being shown as attached to end nodes 7, 8 and 9. Network nodes 11 each comprise a data processing system which provides data communications services to all connected nodes, network nodes and end nodes, as well as providing decision points within the node. The network nodes each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at the node, and the provision of directory services and topology database maintenance at that node. In accordance with the present invention, the end nodes 12 provide enhanced rate-based congestion control for data packets transmitted through the network of FIG. 1.

Each of end nodes 12 comprises either a source of digital data to be transmitted to another end node, a utilization device for consuming digital data received from another end node, or both. Users of the packet communications network 10 of FIG. 1 may utilize an end node device 12 connected to the local network node 11 for access to the packet network 10. The local network node 11 translates the user's data into packets formatted approximately for transmission on the packet network of FIG. 1 and generates the header which is used to route the packets through the network 10. In accordance with the present invention, one or more of nodes 11 and 12 of FIG. 1 is equipped to provide enhanced rate-based adaptive congestion control for access to the network of FIG. 1.

In order to transmit packets on the network of FIG. 1, it is necessary to calculate a feasible path or route through the network from the source node to the destination node for the transmission of such packets. To avoid overload of any of the links on this route, the route is calculated in accordance with an algorithm that insures that adequate bandwidth is available on each leg of the new connection. One such optimal route calculating systems is disclosed in U.S. Pat. No. 5,233,604 granted Aug. 3, 1993. Once such a route is calculated, a connection request message is launched on the network, following the computed route and updating the bandwidth occupancy of each link along the route to reflect the new connection. Data packets may then be transmitted along the calculated route from the originating node to the destination node (and from the destination node to the originating node) by placing this route in the header of the data packet. In prior art systems, if the network of FIG. 1 became congested, the network would detect this condition and attempted to limit the access of traffic to the system. More particularly, test packets sent through the network with a time stamp are used to estimate the congestion in the network, based on the changes in the transit times of successive test packets. The present invention is an improvement on these prior art adaptive control systems.

Figure 2:
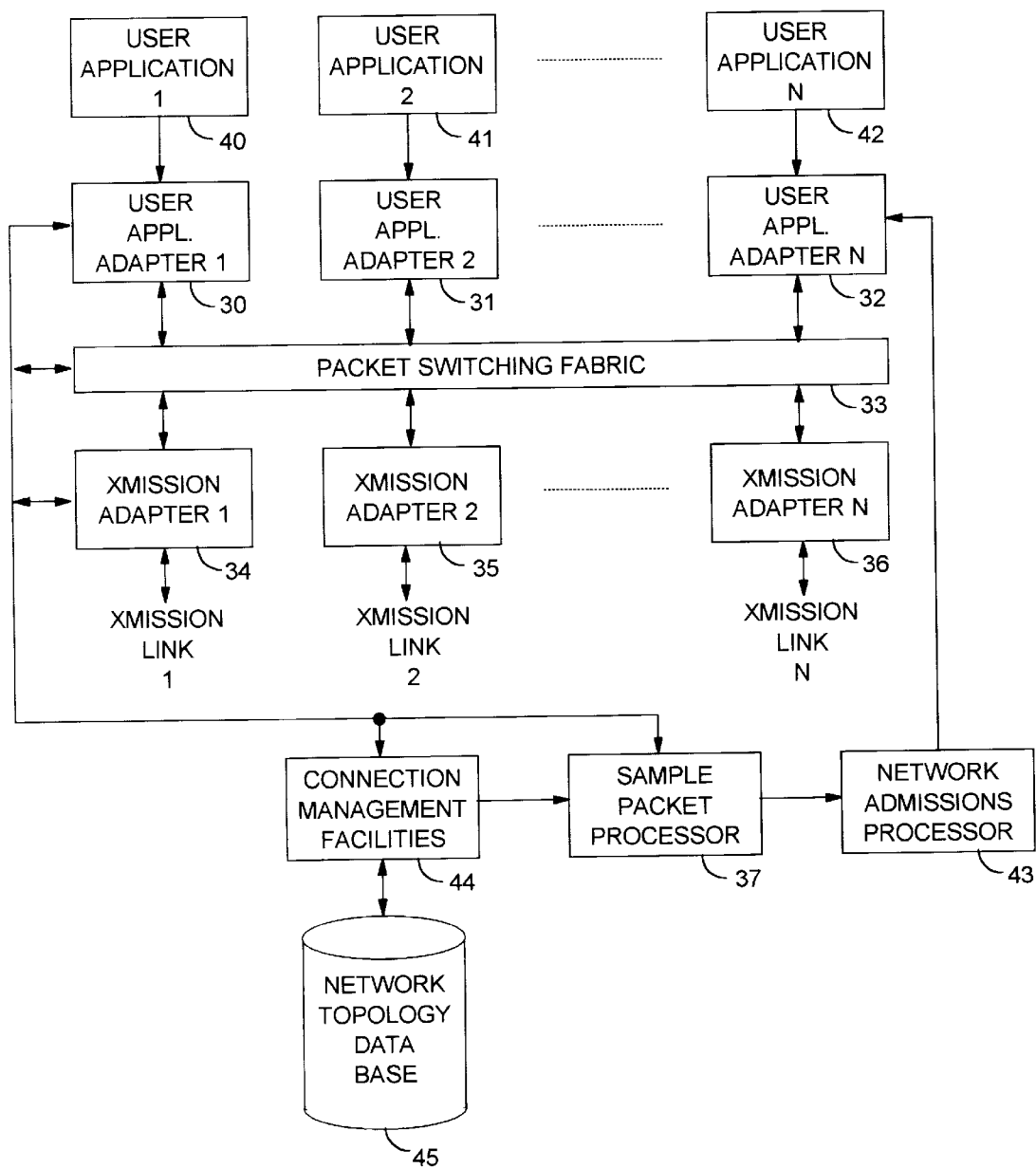
FIG. 2 shows a more detailed block diagram of a typical endmode in the network of FIG. 1 at which point packets may enter the network to be forwarded along the route to a destination for each packet, and in which network admission mechanisms in accordance with the present invention might be implemented.

In FIG. 2 there is shown a general block diagram of a network endmode control circuit which might be found in all of the end nodes 12 of FIG. 1. The endnode control circuit of FIG. 2 comprises a high speed packet switching fabric 33 onto which packets arriving at the nodes are entered. Such packets arrive over transmission links from network nodes of the network, such as links M–O of FIG. 1 via transmission interfaces 34, 35, or 36, or are originated locally via local user interfaces 30, 31 or 32 from user applications 40, 41, . . . 42. Switching fabric 33, under the control of connection management facilities 44, connects each of the incoming data packets to the appropriate one of the outgoing transmission link interfaces 34–36 or to the appropriate one of the local user interfaces 30–32, all in accordance with well-known packet network operations. Indeed, network management control messages are also launched on, and received from, the packet network in the same fashion as data packets. That is, each network packet, data or control message, transmitted on the network of FIG. 1 can be routed by way of switching fabric 30, as shown in FIG. 2.

Routes or paths through the network of FIG. 1 are calculated to satisfy the Quality of Service (QoS) parameters determined to be necessary to adequately transmit a particular data system, as taught in the afore-mentioned patent 5,233,604. These Quality of Service parameters include such things as throughput (bandwidth), latency (path delay) and jitter (latency variations). Assuming that only one class of traffic requires preselected QoS parameters, called reserved traffic, and that at least one other class of traffic can be transmitted on a "best efforts" basis, the maximum use of the network occurs when any available capacity not currently used by the reserved traffic is filled with the best effort traffic. Since the reserved traffic must be transmitted in a timely fashion, it is necessary to control the access of the best efforts traffic so as not to interfere with the reserved traffic. Since, due to changes in traffic loading or outages, congestion occurs in the packet network of FIG. 1, it is necessary to restrict the access of best effort traffic to the network in such a way as to reduce the congestion in the network and allow the reserved traffic to flow unimpeded. One known technique for controlling access to the network is to estimate the congestion in the network and to adjust the input to the network so as to reduce such congestion. In accordance with one well-known congestion estimation technique, taught in R–F. Chang, et al. U.S. Pat. No. 5,367,523, granted Nov. 22, 1994 and in "Adaptive Admission Congestion Control," by Z. Haas, published in *ACM SIGCOMM Computer Communication Review*, pages 58–76, 1991, a sample test packet is transmitted from the source of each data stream to the destination for that data stream. From time stamps carried by the test packets, the receiving station estimates congestion by identifying changes in the transit times of the test packets. The present invention is an improvement on these latter systems using test packets to estimate the congestion in the system of FIG. 1. More particularly, the present invention attempts to estimate the actual level of congestion in the network, rather than relying on relative congestion, i.e., changes in congestion, during successive test sample transmission. This approach can be better seen from the congestion estimation system in the block diagram of FIG. 3.

Referring to FIG. 2, connection management facilities 44 utilize the contents of network topology data base 45 to calculate reserved and best efforts paths through the network of FIG. 1 in response to requests from users 40–42. A sample packet processor 37 generates sample test packets for transmission for the end of FIG. 2 as well as providing the received sample packet processing necessary for test sample packets originating at other end nodes and intended for the end node of FIG. 2. Using the results of this received sample processing, network admissions processor 43 generates control signals to control the access of best efforts signals from user applications 40–42 in user application adapters, 30–32, respectively.

Figure 3:
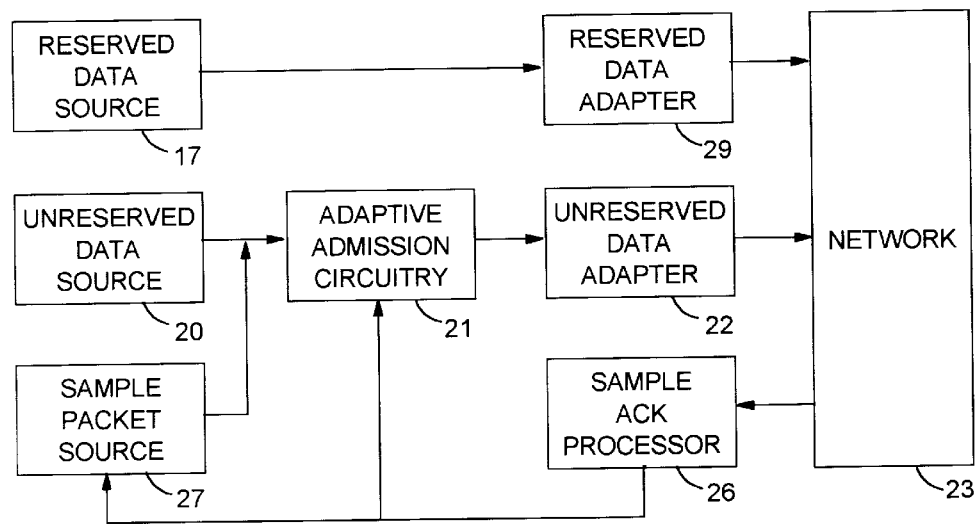
FIG. 3 shows a general block diagram of an embodiment of a network congestion flow control system in accordance with the present invention.

Referring then to FIG. 3, there is shown a general block diagram of the test sample packet processing taking place in blocks 37 and 43 of FIG. 2. More particularly, reserved data source 17 corresponds to one of the user applications 40–42 and delivers reserved data packets to network entry buffer 29 for delivery to network 23, corresponding to the network of FIG. 1. This reserved data traffic is delivered through network 23 to a reserved user at a remote end node of network 23. An unreserved data packet source 20 corresponds to another one of user applications 40–42 and generates non-reserved (best efforts) data packets for transmission on network 23, corresponding to the network of FIG. 1. All traffic in network 23 may be unreserved. Adaptive admission circuitry 21 controls the rate at which unreserved data packets from unreserved data source 20 are applied to network entry buffer 22, which, in turn, supply the sample packets to network 23. A sample packet generator 27 generates test sample packets which are applied through admission circuitry 21 to network entry buffer 22 for transmission on network 23.

At the remote destination (not shown), sampling packets are analyzed to determine the network delays. The remote destination (not shown) returns a sample acknowledgement packet that contains a congestion indicator that can take one of two values, wherein one value indicates that the destination has determined that network congestion exists, and the other value indicates that no congestion exists. The sampling acknowledgement packet is delivered through network 23 to sample acknowledgement process 26 at the source end node the original sample packet. Sample acknowledgment processor 26 extracts the congestion value from the sampling packet acknowledgement and supplies it to adaptive admissions circuitry 21, which then controls admission rates in accordance with an embodiment of a method of the present invention which will now be described.

The goal of flow control is to specify flow rates as close as possible to a share value $\mu(t)/m(t)$ where $\mu(t)$ is the current queue service rate and $m(t)$ is the current number of traffic sources. The queue service rate is the link rate with the least throughput, at an instant of time. Both $\mu(t)$ and $m(t)$ are unknown to sources; current traffic rates and $\mu(t)/m(t)$ values are only indirectly suggested by a congestion indication. Specifying all current rates to be $\mu(t)/m(t)$ would, however, maintain maximum throughput and zero or very low queue length (hence minimum average delay). The share $\mu(t)/m(t)$ is the unknown ideal flow for each active source.

The congestion indication is a preselected pair of values. One value of the pair signals congestion and the other signals no congestion. These may be derived by a network device using any means whatsoever, provided only that the congestion indication sent to the source is one of the preselected pair. The pair of values may be an preselected pair of numbers.

Given a queue maximum $Q_{max}$ which is not to be exceeded, $\Delta t$ may be, in an embodiment of the present invention not more than that value divided by ten times a rough estimate of $\mu(t)$.

Suppose each traffic source in a network has the following information:

1. its own present rate, $r(t)$, and past rate at one preselected time interval, $\Delta t$, in the past, $r(t-\Delta t)$;
2. present knowledge of whether queue length or delay is or is not above a certain threshold (such as zero queue length);
3. for the share ratio $\mu(t)/m(t)$ (a fraction not known to any traffic source), a rough estimate, S, of its maximum possible value.

The present invention provides a method for calculating $r(t+\Delta t)$ from such information which results in high throughput and low queue values. The estimate of maximum share, S, can be too low or two high and still yield good performance. Of course, the less the variation of $\mu(t)/m(t)$ and more accurate the estimate of S, the better the performance. But the strength of the invention is its performance with irregular changes in $\mu(t)$ and $m(t)$ and imperfect estimates of S.

The method consists of specifying traffic rates through a version of critical damping. The shares to which rates are critically damped are in themselves critically damped using binary queue information.

The $\{v_1, v_2\}$ congestion signal is slow damped to provide a share change which is then fast damped to produce flow control values. Specifically, share and send rates are always non-negative and otherwise changed according to the following rules.

If congestion=$v_1$ then the share is damped towards $-f_1$ unless 0 is reached) and the send rates are damped towards zero.

If congestion=$v_2$ then the share is damped towards $+f_2$ and the send rates are damped towards the share.

The preselected values $v_1$ and $v_2$ respectively signal congestion and no congestion. In an embodiment of the present invention, $v_1$ may be chosen to be 1, and $v_2$ may be chosen to be 0. The automatic generation of a changing share is "perceptive" of what a congestion signal $C(t)=v_1$ or $v_2$ indicates about the unknown ideal share $\mu(t)/m(t)$.

In an embodiment of the present invention, the dynamics of S(t) and the send rate of an active connection, $r_i(t)$, are governed by instances of a critical damping equation:

$$x(t+\Delta t)=2x)(t)-x)(t-\Delta t)-k^2[x(t-\Delta t)-L]-2k[x(t)-x(t-\Delta t)] \quad (1)$$

Here k is a constant between 0 and 1. In Equation (1), any initial values for x are followed by values critically damped toward a limit constant L.

Define the maximum share constant, $S_{max}$, to be the maximum link rate in the network.

I the share falls to zero due to congestion $C(t)=v_1$, the share stays at zero until congestion $C(t)=v_2$. Then the share is initialized as $S(t)=\alpha S_{max}$, where $\alpha$ is a preselected constant not exceeding 1. It may be 0.1 in an embodiment of the present invention. Send rates for new connections are initiated as $r_1(t)=\beta S_{max}$, where $\beta$ is a second preselected constant not exceeding 1. An embodiment of the present invention may have a value for $\beta$ of 0.05.

Then, if $C(t)=v_1$ and $S(t)>0$, then determine the share $S(t+\Delta t)$ using:

$$S(t+\Delta t)=\max\{0, 2S(t)-S(t-\Delta t)-k_s^2[S(t-\Delta t)+f_1]-2k_s[S(t)-S(t-\Delta t)]\} \quad (2)$$

The damping constant for the share, $k_s$, has a preselected value less than unity. In an embodiment of the present invention, the value for $k_s$ may be 0.1. The share is damped toward $-f_1$, where $f_1$ is a preselected constant which may be empirically determined and preselected by the user. In an embodiment of the present invention, $f_1$ may have the value $S_{max}$, and in an alternative embodiment $f_1$, may be 0.

Send rate of source number "i", $r_i(t)>0$, $r_i(t+\Delta t)$ is then determined by:

$$r_i(t+\Delta t)=\max\{0, 2r_i(t)-r_i(t-\Delta t)-k_r^2 r_i(t-\Delta t)-2k_r[r_i(t)-r_i(t-\Delta t)]\} \quad (3)$$

The damping constant for the send rate, $k_r$, has a preselected value less than 1. It may be 0.6 in an embodiment of the present invention.

Otherwise, if $C(t)=v_2$ and $S(t)>0$, then share $S(t-\Delta t)$ is determined according to:

$$S(t+\Delta t)=\max\{0, 2S(t)-S(t-\Delta t)-k_s^2[S(t-\Delta t)-f_2]-2k_s[S(t)-S(t-\Delta t)]\} \quad (4)$$

The share is damped toward $-f_2$, where $f_2$ is a preselected constant. In an embodiment of the present invention, $f_1$ may have the value $S_{max}$.

Then the send rate of source device number "i", $r_i(t)>0$, $r_i(t+\Delta t)$ is calculated according to:

$$r_i(t+\Delta t)=\max\{0, 2r_i(t)-r_i(t-\Delta t)-k_r^2[r_i(t-\Delta t)+S(t)]-2k_r[r_i(t)-r_i(t-\Delta t)]\} \quad (5)$$

Equation (5) provides that send rates be critically damped toward the current share value S(t). Equations (3, 4, 5) are instances of critical damping (2).

Figure 4:
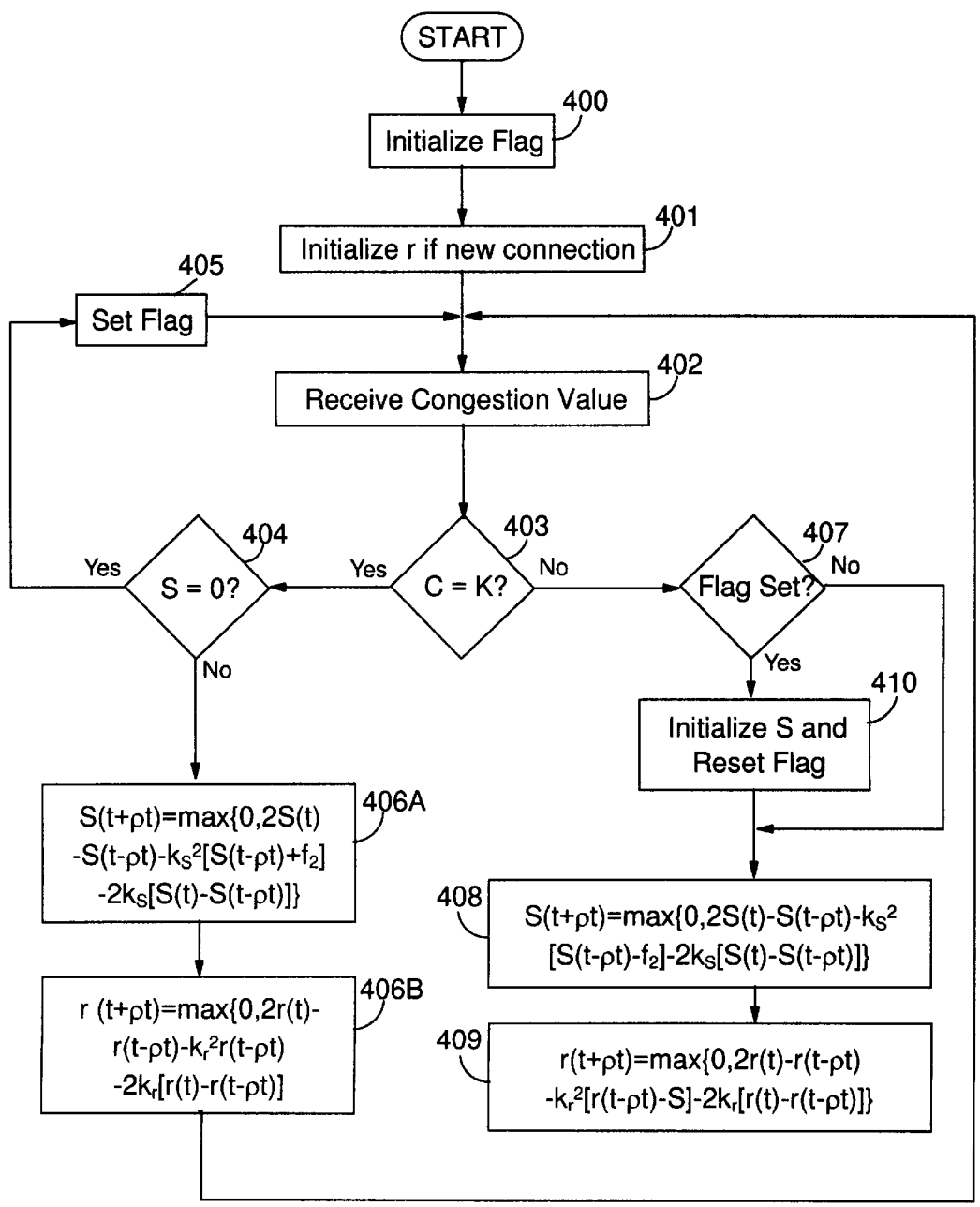
FIG. 4 illustrates a flow diagram of an embodiment of a method of network congestion flow control in accordance with the present invention.

Refer now to FIG. 4 wherein a flow diagram of an embodiment of a method of the present invention is depicted. In step 400, a flag is initialized to a reset value, and in step 401, data rate $r_i$, is set to an initial value if the connection is a new connection. When a congestion signal is received by the data source, step 402, it is tested in step 403 to determine if network congestion has been signalled. In the embodiment of the present invention of FIG. 4, network congestion is signalled by the value, K, which, as discussed hereinabove, may take any preselected value only provided that it may be represented in a sampling packet.

If network congestion is signalled, the present share value is tested, step 404. If it is zero, a flag is set in step 405 and the source waits for the next signalling packet for information as to the state of the network congestion. Otherwise, a new share is calculated based on the critically damped second-order system of Equation (2), step 406A. Then, in step 406B, a new data rate for the source is determined using the critically damped second-order system of Equation (3). Data is sent at that rate until a next congestion signal is received.

If, in step 403, no network congestion was signalled, the flag is tested, step 407. If the flag has not been set, it means that the share had not fallen to zero under congested conditions. Then, a new share is determined using Equation (4), step 408, and, in step 409, a new rate is set using Equation (5). Data is sent at the new rate until a new congestion signal is received. If, in step 407, the flag has been set, then, in step 410, the flag is reset and the share is initialized before the new share is calculated in step 408.

Although the present invention and its advantages have been described in detail, it should be understood that various changes, substitutions and alterations can be made herein without departing from the spirit and scope of the invention as defined by the appended claims.

What is claimed is:

1. In a data processing network, a method of data flow control between nodes in the network comprising the steps of:

determining a share of network capacity that a data source should have according to a critically damped second-order system; and determining a source node data rate using said share when a network congestion signal indicates no congestion, said source node data rate representing a data sending rate of a source node.

2. The method of claim 1 wherein said source node data rate $r_i(t+\Delta t)$ is calculated from:

$$r_i(t+\Delta t)=\max\{0, 2r_i(t)-r_i(t-\Delta t)-k_r^2 r_i(t-\Delta t)-2k_r[r_i(t)-r_i(t-\Delta t)]\}$$

when said network congestion signal indicates network congestion, wherein $k_r$ is a damping constant, and wherein said network congestion signal is provided from a network device to said source node.

3. The method of claim 2 wherein said share $S(t+\Delta t)$ is calculated from:

$$S(t-\Delta t)=\max\{0, 2S)(t)-S(t-\Delta t)-k_s^2[S(t-\Delta t)-k_s^2[S(t-\Delta t)+f_1]-2k_s[S(t)-S(t-\Delta t)]\}$$

when said network congestion signal indicates network congestion, wherein $k_s$ is a damping constant, and $f_1$ is a preselected constant.

4. The method of claim 3 wherein said damping rate, $k_r$, is in the range from 0 to 1, and said damping rate, $k_s$, is in the range from 0 to 1.

5. The method of claim 3 wherein said $f_1$ is equal to a maximum link rate in the network.

6. The method of claim 1 wherein said source node data rate $r_i(t+\Delta t)$ is calculated from:

$$r_i(t-\Delta t)=\max\{0, 2_i(t)-r_i(t-\Delta t)-k_r^2[r_i(t-\Delta t)-S(t)]-2k_r[r_i(t)-r_i(t-\Delta t)]\}$$

when said network congestion signal indicates no network congestion, wherein $k_r$ is a damping constant, and said network congestion signal is provided from a network device to said source node.

7. The method of claim 5 wherein said share S(t+Δt) is calculated from:

$$S(t+\Delta t)=\max\{0, 2S(t)-S(t-\Delta t)-k_s^2[S(t-\Delta t)-f_2]-2k_s[S(t)-S(t-\Delta t)]\}$$

when said network congestion signal indicates no network congestion, wherein $k_s$ is a damping constant, and $f_2$ is a preselected target share value.

8. The method of claim 7 wherein said damping rate, $k_s$, is in the range from 0 to 1, and said damping rate, $k_s$ is in the range from 0 to 1.

9. The method of claim 7 wherein said $f_2$ is equal to a maximum link rate in the network.

10. The method of claim 1 wherein said share S(t+Δt) is calculated from:

$$S(t-\Delta t)=\max\{0, 2S(t)-S(t-\Delta t)-k_s^2[S(t-\Delta t)-f_1]-2k_s[S(t)-S(t-\Delta t)]\}$$

when said network congestion signal indicates network congestion, wherein $k_s$ is a damping constant, $f_1$ is a preselected constant, and said network congestion signal is provided from a network device to said source node.

11. The method of claim 1 wherein said share S(t–Δt) is calculated from:

$$S(t+\Delta t)=\max\{0, 2S(t)-S(t-\Delta t)-k_s^2[S(t-\Delta t)-f_2]-2k_s[S(t)-S(t-\Delta t)]\}$$

when said network congestion signal indicates no network congestion, wherein $k_r$ is a damping constant, and $f_2$ is a preselected constant representing a target share value, and wherein said network congestion signal is provided from a network device to said source node.

12. In a data processing network, a data processing system for data flow control between nodes in the network comprising:

circuitry for determining a share of network capacity that a data source should have according to a critically damped second-order system; and circuitry coupled and responsive to said share determine circuitry for determining a source node data rate using said share when a network congestion signal indicates no congestion, said source node data rate representing a data sending rate of a source node.

13. The data processing system of claim 12 wherein said source data rate $r_i(t-\Delta t)$ is calculated from:

$$r_i(t-\Delta t)=\max\{0, 2r_i(t)-r_i(t-\Delta t)-k_r^2 r_i(t-\Delta t)-2k_r[r_i(t)-r_i(t-\Delta t)]\}$$

when said network congestion signal indicates network congestion, wherein $k_r$ is a damping constant, and said network congestion signal is provided from a network device to said source node.

14. The data processing system of claim 13 wherein said share S(t+Δt) is calculated from:

$$S(t+\Delta t)=\max\{0, 2S(t)-S(t-\Delta t)-k_s^2[S(t-\Delta t)-f_1]-2k_s[S(t)-S(t-\Delta t)]\}$$

when said network congestion signal indicates network congestion, wherein $k_s$ is a damping constant and $f_1$ is a preselected constant.

15. The data processing system of claim 14 wherein said $f_1$ is equal to a maximum network link rate.

16. The data processing system of claim 12 wherein said source node data rate is $r_i(t+\Delta t)$ calculated from:

$$r_i(t-\Delta t)=\max\{0, 2r_i(t)-r_i(t-\Delta t)-k_r^2[r_i(t-\Delta t)-S(t)]-2k_r[r_i(t)-r_i(t-\Delta t)]\}$$

when said network congestion signal indicates no network congestion, wherein $k_r$ is a damping constant, and said network congestion signal is provided from a network device to said source node.

17. The data processing system of claim 16 wherein said share S(t+Δt) is calculated from:

$$S(t+\Delta t)=\max\{0, 2S(t)-s(t-\Delta t)-k_s^2[S(t-\Delta t)-f_2]-2k_s[S(t)-s(t-\Delta t)]\}$$

when said network congestion signal indicates no network congestion, wherein $k_s$ is a damping constant, and $f_2$ is a preselected target share value.

18. The data processing system of claim 17 wherein said $f_2$ is equal to a maximum network link rate.

19. The data processing system of claim 12 wherein said share S(t+Δt) is calculated from:

$$S(t+\Delta t)=\max\{0, 2S(t)-S(t-\Delta t)-k_s^2[S(t-\Delta t)+f_1]-2k_s[S(t)-S(t-\Delta t)]\}$$

when said network congestion signal indicates network congestion, wherein $k_2$ is a damping constant and $f_1$ is a preselected constant, and said network congestion signal is provided from a network device to said source node.

20. The data processing system of claim 12 wherein said share S(t+Δt) is calculated from:

$$S(t+\Delta t)=\max\{0, 2S(t)-S(t-\Delta t)-k_s^2[S(t-\Delta t)-f_2]-2k_s[S(t)-S(t-\Delta t)]\}$$

when said network congestion signal indicates no network congestion, wherein $k_s$ is a damping constant, $f_2$ is a preselected target share value, and said network congestion signal is provided from a network device to said source node.

21. A program product adaptable for storage on a storage media, said program product operable for determining data flow control from a source node to a destination node within a data processing network comprising:

programming for determining a share of network capacity that a data source should have according to a critically damped second-order system; and programming for determining a source node data rate using said share when a network congestion signal indicates no congestion, said source node data rate representing a data sending rate of a source node.

22. The program product adaptable for storage on a storage media of claim 21 wherein said source node data rate is calculated from:

$$r_i(t+\Delta t)=\max\{0, 2r_i(t)-r_i(t-\Delta t)-k_r^2 r_i(t-\Delta t)-2k_r[r_i(t)-r_i(t-\Delta t)]\}$$

when said network congestion signal indicates network congestion, wherein $k_r$ is a damping constant, and said network congestion signal is provided from a network device to said source node.

23. The program product adaptable for storage on a storage media of claim 22 wherein said share S(t+Δt) is calculated from:

$$S(t-\Delta t)=\max\{0, 2S(t)-S(t-\Delta t)-k_s^2[S(t-\Delta t)-f_1]-2k_s[S(t)-S(t-\Delta t)]\}$$

when said network congestion signal indicates network congestion, wherein $k_s$ is a damping constant, and $f_1$ is a preselected constant.

24. The program product available for storage on a storage media of claim 23 wherein said $f_1$ is equal to a maximum link rate in the network.

25. The program product adaptable for storage on a storage media of claim 21 wherein said source node data rate $r_i(t+\Delta t)$ is calculated from:

$$r_i(t+\Delta t)=\max\{0, 2r_i(t)-r_i(t)-r_i(t-\Delta t)-k_r^2[r_i(t-\Delta t)-S(t)]-2k_r[r_i(t)-r_i(t-\Delta t)]\}$$

when said network congestion signal indicates no network congestion, wherein $k_r$ is a damping constant, and said network congestion signal is provided from a network device to said source node.

26. The program product adaptable for storage on a storage media of claim 25 wherein said share $S(t-\Delta t)$ is calculated from:

$$S(t+\Delta t)=\max\{0,\ 2S(t)-S)(t-\Delta t)-k_s^2[S(t-\Delta t)+f_1]-2k_s[S(t)-S(t-\Delta t)]\}$$

when said network congestion signal indicates no network congestion, wherein $k_s$ is a damping constant and $f_2$ is a preselected target share value.

27. The program product adaptable for storage on a storage media of claim 26 wherein said $f_2$ is equal to a maximum link rate in the network.

28. The program product adaptable for storage on a storage media of claim 21 wherein said share $S(t-\Delta t)$ is calculated from:

$$S(t+\Delta t)=\max\{0,\ 2S(t)-S(t-\Delta t)-k_s^2[S(t-\Delta t)+f_1]-2k_s[S(t)-S(t-\Delta t)]\}$$

when said network congestion signal indicates network congestion, wherein $k_s$ is a damping constant, $f_1$ is a preselected constant, and said network congestion signal is provided from a network device to said source node.

29. The program product adaptable for storage on a storage media of claim 21 wherein said share $S(t-\Delta t)$ is calculated from:

$$S(t+\Delta t)=\max\{0,\ 2S(t)-S(t-\Delta t)-k_s^2[S(t-\Delta t)+f_1]-2k_sS(t)-S(t-\Delta t)]\}$$

when said network congestion signal indicates no network congestion, wherein $k_s$ is a damping constant, $f_2$ is a preselected target share value, and said network congestion signal is provided from a network device to said source node.

\* \* \* \* \*